US011661080B2

(12) United States Patent
Oyama

(10) Patent No.: US 11,661,080 B2
(45) Date of Patent: May 30, 2023

(54) VEHICLE TRAVELING CONTROL SYSTEM

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 32 days.

(21) Appl. No.: 16/890,732

(22) Filed: Jun. 2, 2020

(65) Prior Publication Data

US 2021/0039673 A1 Feb. 11, 2021

(30) Foreign Application Priority Data

Aug. 6, 2019 (JP) .............................. JP2019-144788

(51) Int. Cl.
*B60W 60/00* (2020.01)
*B60W 30/04* (2006.01)
*B60W 40/103* (2012.01)
(Continued)

(52) U.S. Cl.
CPC ........ *B60W 60/0011* (2020.02); *B60W 30/04* (2013.01); *B60W 40/103* (2013.01);
(Continued)

(58) Field of Classification Search
CPC ............. B60W 60/0011; B60W 30/04; B60W 40/103; B60W 60/0016; B60W 2555/00;
(Continued)

(56) References Cited

U.S. PATENT DOCUMENTS

2015/0336607 A1  11/2015 Inoue
2017/0277192 A1*  9/2017 Gupta ................... B60W 30/20
(Continued)

FOREIGN PATENT DOCUMENTS

JP    2017-182129 A    10/2017
JP    2017-182568 A    10/2017
(Continued)

OTHER PUBLICATIONS

Harding, J., Powell, G., R., Yoon, R., Fikentscher, J., Doyle, C., Sade, D., Lukuc, M., Simons, J., & Wang, J; Vehicle-to-vehicle communications: Readiness of V2V technology for application; 2014; (Report No. DOT HS 812 014). Washington, DC: National Highway Traffic Safety Administration; pp. 13, 75 (Year: 2014).*

(Continued)

*Primary Examiner* — Aniss Chad
*Assistant Examiner* — Chase L Cooley
(74) *Attorney, Agent, or Firm* — McDermott Will & Emery LLP

(57) ABSTRACT

A traveling control system includes a first acquisition unit, a second acquisition unit, a path plan setter and a controller. The first a acquisition unit communicates with a cloud environment including an edge environment to acquire cloud information including traveling information of other vehicles from at least the edge environment. The second acquisition unit recognizes a traveling environment of an own vehicle and acquires own vehicle traveling information including the recognized traveling environment and a vehicle control state of the own vehicle. The path plan setter sets a path plan in automatic driving control to cause the own vehicle to travel automatically. The determines a need for changing the path plan and the automatic driving control based on the cloud information and controls traveling behavior of the own vehicle according to the need for a change based on the cloud information and the own vehicle traveling information.

11 Claims, 8 Drawing Sheets

(51) Int. Cl.
  *G08G 1/01* (2006.01)
  *G08G 1/16* (2006.01)
(52) U.S. Cl.
  CPC ....... *B60W 60/0016* (2020.02); *G08G 1/0141* (2013.01); *G08G 1/162* (2013.01); *B60W 2555/00* (2020.02)
(58) Field of Classification Search
  CPC ..... B60W 30/02; G08G 1/0141; G08G 1/162; G08G 1/0112; G08G 1/096775; G08G 1/09675; G08G 1/096725; G08G 1/0133
  See application file for complete search history.

(56) References Cited

U.S. PATENT DOCUMENTS

| | | | |
|---|---|---|---|
| 2018/0082178 A1 | 3/2018 | Nakamura et al. | |
| 2019/0113927 A1* | 4/2019 | Englard | ............... G05D 1/0221 |
| 2020/0247426 A1* | 8/2020 | Rafferty | .............. B60W 50/082 |
| 2021/0035442 A1* | 2/2021 | Baig | .................... G08G 1/0133 |
| 2021/0116907 A1* | 4/2021 | Altman | ................. B60W 50/04 |

FOREIGN PATENT DOCUMENTS

| | | |
|---|---|---|
| JP | 2017-200791 A | 11/2017 |
| JP | 2018-060520 A | 4/2018 |
| JP | 2019-026103 A | 2/2019 |
| WO | 2014/115262 A1 | 7/2014 |
| WO | 2019/008755 A1 | 1/2019 |

OTHER PUBLICATIONS

Japanese Notice of Reasons for Refusal issued in corresponding Japanese Patent Application No. 2019-144788, dated Mar. 28, 2023, with English translation.

* cited by examiner

VEHICLE TRAVELING CONTROL SYSTEM

CROSS-REFERENCE TO RELATED APPLICATIONS

The present application claims priority from Japanese Patent Application No. 2019-144788 filed on Aug. 6, 2019, the entire contents of which are hereby incorporated by reference.

BACKGROUND

The technology relates to a vehicle traveling control system that causes a vehicle to travel by automatic driving.

Development of an automatic driving system that causes a vehicle to automatically travel without requiring a driver to perform driving operation in a vehicle such as an automobile is in progress, and as a final level, the system is expected to be responsible for all functions including when an abnormality occurs.

Prior to traveling, this automatic driving system generally creates a path plan planning how the vehicle should move in the future. For example, Japanese Unexamined Patent Application Publication No. 2019-26103 proposes a path planner that calculates a reward for movement to a target position based on validity for the vehicle to move to the target position and determines the target position of the vehicle after a predetermined time according to a policy based on the reward.

SUMMARY

An aspect of the technology provides a vehicle traveling control system. The vehicle traveling control system includes a cloud information acquisition unit, an own vehicle traveling information acquisition unit, a path plan setter, and a traveling behavior controller. The cloud information acquisition unit is configured to communicate with a cloud environment including an edge environment and acquire cloud information including traveling information of other vehicles from at least the edge environment. The own vehicle traveling information acquisition unit is configured to recognize a traveling environment of an own vehicle and acquire own vehicle traveling information including the recognized traveling environment and a vehicle control state of the own vehicle. The path plan setter is configured to set a path plan in automatic driving control to cause the own vehicle to travel automatically. The traveling behavior controller is configured to determine whether it is necessary to change the path plan and the automatic driving control on a basis of the cloud information and control traveling behavior of the own vehicle according to the need for a change and on a basis of the cloud information and the own vehicle traveling information.

An aspect of the technology provides a vehicle traveling control system. The vehicle traveling control system includes circuitry. The circuitry is configured to communicate with a cloud environment including an edge environment and acquire cloud information including traveling information of other vehicles from at least the edge environment. The circuitry is configured to recognize a traveling environment of an own vehicle, acquire own vehicle traveling information including the recognized traveling environment and a vehicle control state of the own vehicle. The circuitry is configured to set a path plan in automatic driving control to cause the own vehicle to travel automatically. The circuitry is configured to determine whether it is necessary to change the path plan and the automatic driving control on a basis of the cloud information and control traveling behavior of the own vehicle according to the need for a change and on a basis of the cloud information and the own vehicle traveling information.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

The automatic driving system needs to autonomously handle a sudden environment change or dangerous situation. However, control handling such an environment change or dangerous situation may deviate from traveling behavior of automatic driving following a normal path plan or may mismatch the driver's feeling or may cause an uncomfortable feeling or a sense of insecurity.

In view of the above-described circumstances, it is desirable to provide a vehicle traveling control system capable of controlling traveling behavior of a vehicle depending on the need for a change to a path plan of automatic driving and automatic driving control, and reducing the driver's uncomfortable feeling or sense of insecurity even in a case where an environment change or a dangerous situation is predicted during traveling by automatic driving.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
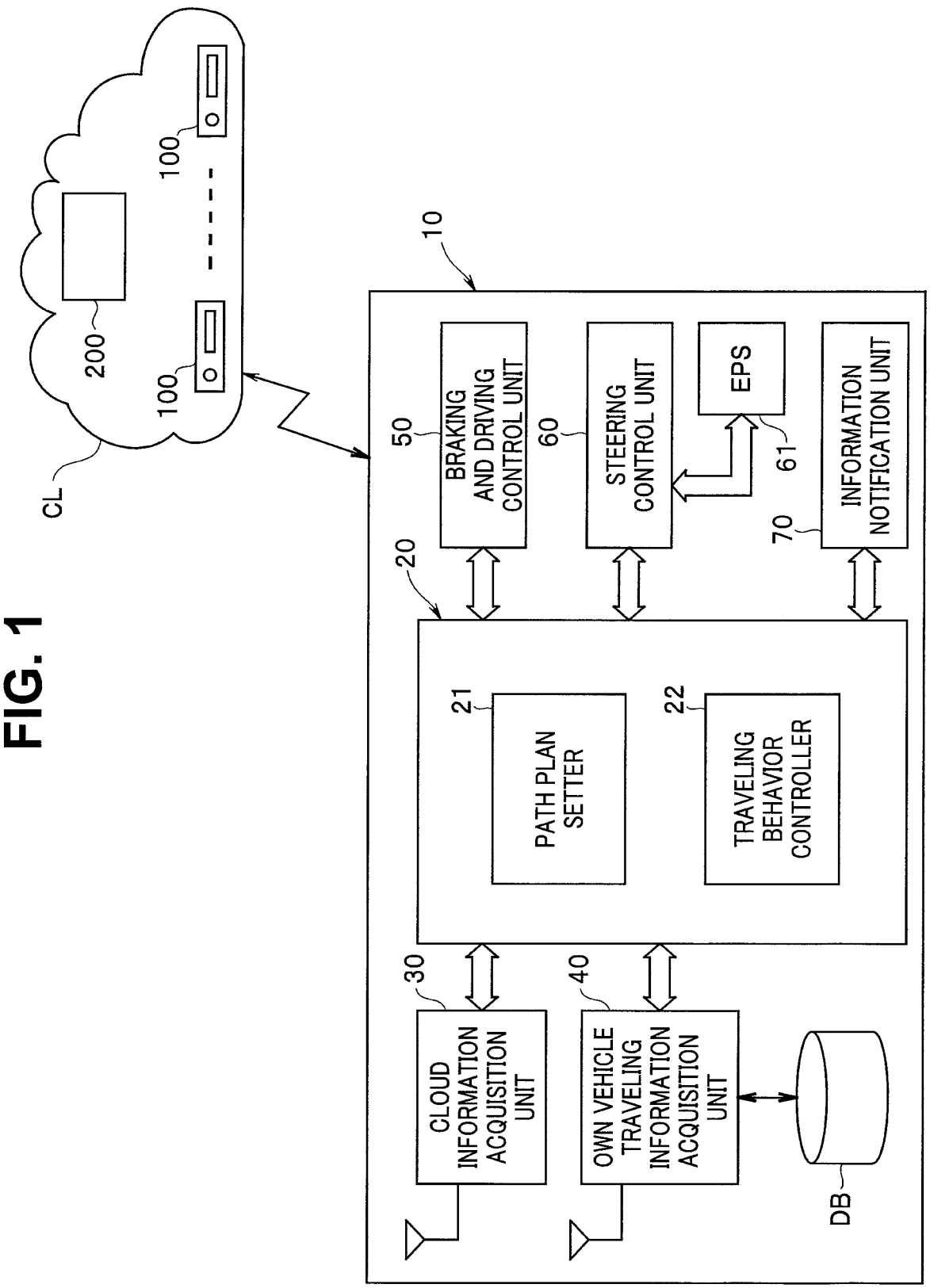
FIG. 1 is a configuration diagram illustrating a vehicle traveling control system.

FIG. 1 is a configuration diagram illustrating a vehicle traveling control system. A traveling control system 10 illustrated in FIG. 1 is provided with a main function of automatic driving control that causes a vehicle to travel automatically without requiring the driver's driving operation and also a function of driving assist control that assists the driver in traveling by manual driving.

The traveling control system 10 is coupled to a cloud environment CL, and is configured to carry out data communication, receive cloud information including traveling information of other vehicles from the cloud environment CL and transmit traveling information of the own vehicle to the cloud environment CL. The cloud environment CL includes a single or a plurality of cloud servers 200 provided in a cloud space of a broadband communication area and a plurality of edge servers 100 provided in an edge space (edge environment), which is a narrow-band communication area in the cloud space.

The edge server 100 is a server placed in an intermediate layer between the cloud server 200 and a user device, and is configured to perform high speed communication near a user and provide information with a low delay. For example, the edge server 100 can be disposed in a traffic light or auxiliary equipment of highway roads, or base stations for high speed communication such as mobile phones and enables high speed and efficient distributed processing.

The traveling control system 10 is constructed mainly of an automatic driving control unit 20 configured to control traveling by automatic driving. A cloud information acquisition unit 30, an own vehicle traveling information acquisition unit 40, a braking and driving control unit 50, a steering control unit 60 and an information notification unit 70 or the like are coupled to the automatic driving control unit 20 via an in-vehicle network so that they can communicate with each other. Each of the units 20 to 70 is mainly constructed of a single or a plurality of computers.

The cloud information acquisition unit 30 is provided with a communication apparatus provided for network connection to the cloud environment CL and is configured to acquire cloud information from the cloud environment CL. The cloud information includes traveling information of plurality of other vehicles coupled to the cloud environment CL. The traveling information of the other vehicles includes a traveling position, a traveling environment and vehicle control information, and the cloud information acquisition unit 30 acquires the information from at least the edge server 100 and transmits the information to the automatic driving control unit 20. Based on the information from the edge server 100 acquired via the cloud information acquisition unit 30, the automatic driving control unit 20 can grasp, substantially in real time and quickly, events (dangerous events) indicating a dangerous situation ahead of the own vehicle, for example, deterioration of a road environment due to a sudden change of weather, urgent action by the preceding vehicle for avoidance of an obstacle, lane departure traveling of an oncoming vehicle.

The own vehicle traveling information acquisition unit 40 recognizes an external environment surrounding the own vehicle and a traveling environment such as the traveling position of the own vehicle and is configured to acquire own vehicle traveling information including the recognized traveling environment and a vehicle control state of the own vehicle. The external environment recognition result and the own vehicle traveling information by the own vehicle traveling information acquisition unit 40 are transmitted to the automatic driving control unit 20 via an in-vehicle network. The own vehicle traveling information acquisition unit 40 transmits information similar to the traveling information to be transmitted from the other vehicles to the cloud environment CL to the cloud environment CL as the own vehicle traveling information of the own vehicle.

For example, the own vehicle traveling information acquisition unit 40 transmits speeds (speeds relative to the own vehicle) of the preceding vehicle ahead of the own vehicle and the following vehicle behind the own vehicle, an inter-vehicle distance, a surface state of the road, a traveling point and time, a weather condition during traveling, a vehicle control state of the own vehicle or the like, to the cloud environment CL as own vehicle traveling information. The vehicle control state includes, for example, acceleration, deceleration, a steering speed, a yaw rate, an operating state of an anti-lock brake system or an operating state of a side slip prevention apparatus. The traveling information transmitted from the other vehicles to the cloud environment CL is also basically the same.

For this reason, the own vehicle traveling information acquisition unit 40 is provided with devices for autonomously sensing an external environment of the own vehicle such as a camera, a millimeter wave radar or a laser radar and a locator for measuring the own position using a GNSS (Global Navigation Satellite System) or the like. The own vehicle traveling information acquisition unit 40 recognizes an external environment surrounding the own vehicle from detection information of objects around the own vehicle detected using a camera or a radar or the like, traffic information acquired by infrastructure communication such as road-vehicle communication or vehicle-to-vehicle communication, position information of the own vehicle measured by receiving signals from a GNSS satellite and the like, and acquires various kinds of control information on vehicle control via an in-vehicle network.

The own vehicle traveling information acquisition unit 40 is provided with a map database DB and identifies a position on map data of the map database DB from the position data of the own vehicle measured by the locator. The map database DB is a database holding a high accuracy digital map created for traveling control including automatic driving and is stored in a large volume storage medium such as an HDD (hard disk drive) or an SSD (solid state drive).

To be more specific, the high accuracy digital map is configured as a multi-dimensional map (dynamic map) storing static information such as road shapes and connection relationship between roads and dynamic information such as traffic information collected by infrastructure communication in a plurality of layers. As the road data, the type of a road lane line, the number of lanes, widths of lanes, point sequence data indicating a central position in the width direction of a lane, curvature of a lane, traveling azimuth angle of a lane, limit speed or the like are included and stored together with attribute data such as reliability of data or date of data update.

The braking and driving control unit 50 controls a traveling drive force generated in an electric motor or an internal combustion engine and controls a traveling speed of the own vehicle, switching between forward and backward traveling, brake or the like. For example, the braking and driving control unit 50 controls an operating state of the engine based on signals from various sensors detecting the engine operating state and various kinds of control information acquired via an in-vehicle network and controls brake apparatuses (not illustrated) of the four wheels based on a brake switch, wheel speeds of the four wheels, steering angle, yaw rate and other vehicle information independently of the driver's brake operation. Furthermore, the braking and driving control unit 50 calculates brake liquid pressures of the respective wheels based on brake forces of the respective wheels and performs anti-lock brake control, side slip prevention control or the like.

The steering control unit 60 controls steering torque by an electric power steering (EPS) unit 61 provided in a steering system based on, for example, vehicle speed, the driver's steering torque, steering angle, yaw rate, and other vehicle information. The control of the steering torque is performed as current control on an electric motor of the EPS unit 61 that realizes target steering torque for matching the actual steering angle to a target steering angle. The EPS unit 61 assumes the target steering torque from the steering control unit 60 as instruction torque and controls the drive current of the electric motor corresponding to the instruction torque through, for example, PID control.

The information notification unit 70 controls output of a warning when an abnormality occurs in various apparatuses of the vehicle or for attracting the driver's attention and various kinds of information to be presented to the driver. Warning or control information is notified using, for example, at least one of visual output such as a monitor, display or alarm lamp or auditory output such as a speaker or buzzer. While traveling control including automatic driving is in progress, the information notification unit 70 presents the control state to the driver, and when traveling control including automatic driving is paused by the driver's operation, the information notification unit 70 notifies the driver of the operating state at that time.

Next, the automatic driving control unit 20, which is the center of the traveling control system 10 will be described. In contrast to a manual driving mode in which the driver performs all driving operations such as steering, acceleration/deceleration and braking to cause the own vehicle to travel, the automatic driving control unit 20 performs control on a driving assist mode in which the driver's driving operation is assisted or an automatic driving mode in which the driver's driving operation is not required. In this automatic driving mode, the automatic driving control unit 20 performs traveling control via the braking and driving control unit 50 and the steering control unit 60 based on the information from the cloud information acquisition unit 30 and the own vehicle traveling information acquisition unit 40.

Note that the driving mode can be switched from the driving mode in an initial state to a desired driving mode by the driver operating a switch, a panel (not illustrated) or the like. The driving mode in the initial state may be any one of the manual driving mode, the driving assist mode and the automatic driving mode, and is set as appropriate according to the level of automatic driving.

In this case, the driving assist mode means a driving mode that requires the driver's steering holding or steering and automatically performing at least one of acceleration/deceleration control or steering control, and includes partial automatic driving. On the other hand, the automatic driving mode means a driving mode presupposing a hand-off driving without the driver touching the steering wheel and includes a conditional automatic driving mode, a high level automatic driving mode and a completely automatic driving mode.

In the conditional automatic driving mode, the system performs all driving tasks of acceleration/deceleration control and steering control in a designed driving region where the automatic driving function normally operates and operation is entrusted to the driver when it is difficult to continue the operation. In the high level automatic driving mode, the system performs all the driving tasks under limited conditions and the system responds to cases where it is difficult to continue the operation in the limited region. In the completely automatic driving mode, the system performs all the driving tasks without any limited conditions and the system responds to cases where it is difficult to continue the operation unlimitedly.

The automatic driving control unit 20 is provided with a path plan setter 21 and a traveling behavior controller 22 as functional parts associated with automatic driving control. The automatic driving control unit 20 sets a path plan for automatic driving and performs control so as to realize traveling behavior of automatic driving according to the path plan in the automatic driving mode.

When a dangerous event is recognized from the cloud information, the automatic driving control unit 20 controls the traveling behavior to avoid the dangerous event. In the automatic driving mode, unlike the manual driving mode and the driving assist mode, even if the automatic driving control unit 20 encounters a dangerous event due to a sudden environment change or deterioration of the traffic situation, the automatic driving control unit 20 needs to avoid these dangerous events autonomously. However, control for avoiding dangerous events may mismatch the driver's feeling.

For this reason, when the automatic driving control unit 20 recognizes a dangerous event ahead of the own vehicle substantially in real time based on the cloud information, particularly on the cloud information transmitted from the edge server 100 with a low delay, the automatic driving control unit 20 switches the control according to a margin time for the dangerous event. The margin time in this case is a time to reach a position where the dangerous event can be avoided by automatic driving control. Hereinafter, more specific functions of the automatic driving control unit 20 will be described.

When a passenger (driver) inputs information (facility name, address, telephone number or the like) of a destination or transit point or directly specifies the information on a map displayed on a panel or the like, the path plan setter 21 plans position coordinates (latitude, longitude) of an optimum traveling route from road conditions, geographic conditions, environmental conditions and the like with reference to the map database DB and the cloud information, and also plans a track to move the own vehicle along the traveling route with smooth behavior. The track is intended to handle a time variation in the traffic environment with respect to the spatial traveling route consisting mainly of a digital map. The path plan setter 21 can set a path plan combining a traveling route plan and a track plan based on the cloud information from the cloud information acquisition unit 30, the map information from the own vehicle traveling information acquisition unit 40, the external environment surrounding the own vehicle and the vehicle control information and also changes the path plan dynamically.

The traveling behavior controller 22 determines the traveling behavior for causing the own vehicle to travel by automatic driving according to the path plan set by the path plan setter 21 based on a braking and driving amount for the braking and driving control unit 50 and a steering amount for the steering control unit 60, and outputs control instruction values corresponding to the braking and driving control unit 50 and the steering control unit 60. In this case, the traveling behavior controller 22 determines whether it is necessary to change the path plan and automatic driving control based on the cloud information and controls the traveling behavior of the own vehicle depending on the determination result of the need for a change based on the cloud information and own vehicle traveling information.

Whether it is necessary to change the path plan and automatic driving control is determined from the cloud information depending on whether a dangerous event ahead of the own vehicle is recognized. When the dangerous event is recognized, the traveling behavior controller 22 determines that the path plan and the automatic driving control need to be changed, and further determines whether the dangerous event can be avoided by automatic driving control based on the path plan according to a margin time for the dangerous event.

Figure 2:
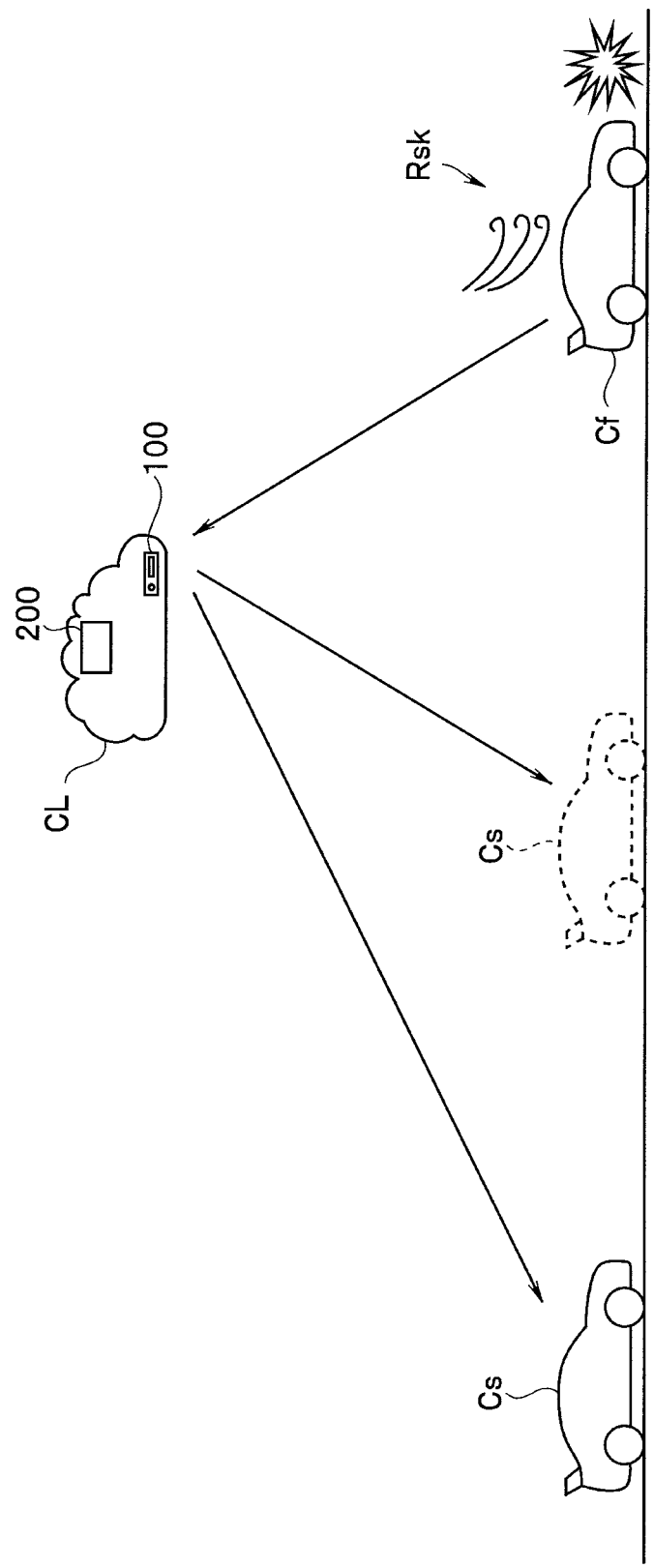
FIG. 2 is an explanatory diagram illustrating control switching depending on a margin time for a dangerous event.

For example, when information that a traffic regulation is enforced due to an accident or the like at a relatively remote place is received from the cloud server 200 and this is recognized as a dangerous event, there is a sufficient margin time for the dangerous event, and so the traveling behavior controller 22 changes the current path plan and instructs the path plan setter 21 to make a path setting such as taking a detour route. The same applies to a case where a dangerous event at a place relatively near the edge server 100 is recognized, and, for example, as illustrated in FIG. 2, whether it is necessary to change the path plan and automatic driving control is determined depending on a margin time for the dangerous event. FIG. 2 is an explanatory diagram illustrating control switching depending on a margin time for the dangerous event.

For example, as illustrated in FIG. 2, when the traveling behavior controller 22 recognizes that a dangerous event Rsk that may cause destabilization of vehicle behavior due to an influence of strong wind or the like has occurred against a preceding vehicle Cf ahead of the own vehicle Cs from the cloud information, the traveling behavior controller 22 examines whether a margin time TR for the dangerous event Rsk is a threshold Tset or higher. The threshold Tset is set for each dangerous event with the time required to change the path plan taken into account. In the case of TR≥Tset, the traveling behavior controller 22 determines that it is possible to avoid the dangerous event Rsk by automatic driving control and instructs the path plan setter 21 to make a path setting.

The path setting in this case is intended to change the current path plan and create an avoidance path plan to avoid the dangerous event. The avoidance path plan is presented to the driver to allow the driver to select either one of automatic driving based on the avoidance path plan and manual driving by the driver. For example, information that a dangerous event has occurred ahead and the current path plan needs to be changed or contents of the avoidance path plan to avoid the dangerous event are displayed and a screen for selecting automatic driving based on the avoidance path plan or manual driving by the driver is displayed on a display.

When the driver selects the manual driving, the traveling behavior controller 22 stops the automatic driving control and performs control so as to realize traveling behavior according to the manual driving. In this case, for example, steering assist control or acceleration/deceleration control may be performed so as to realize traveling behavior of driving assist for the manual driving. When the driver selects automatic driving according to the avoidance path plan, the traveling behavior controller 22 changes a control instruction value of automatic driving according to the avoidance path plan and performs control so as to avoid the dangerous event by automatic driving.

On the other hand, when the own vehicle Cs is located at a position illustrated by a broken line in FIG. 2 and the margin time TR is shorter than the threshold Tset (TR<Tset), the traveling behavior controller 22 determines that the dangerous event cannot be avoided by the automatic driving control, and switches the automatic driving control to the high motion control. In order to avoid the dangerous event, the high motion control is vehicle control that increases limit values such as a yaw rate, lateral acceleration, front-rear acceleration compared to those in normal traveling and increases the vehicle motion performance to performance close to a limit and allows a plurality of control systems to be switched as appropriate. Note that automatic driving control immediately before the switching to the high motion control is also included in this normal operation.

Figure 3:
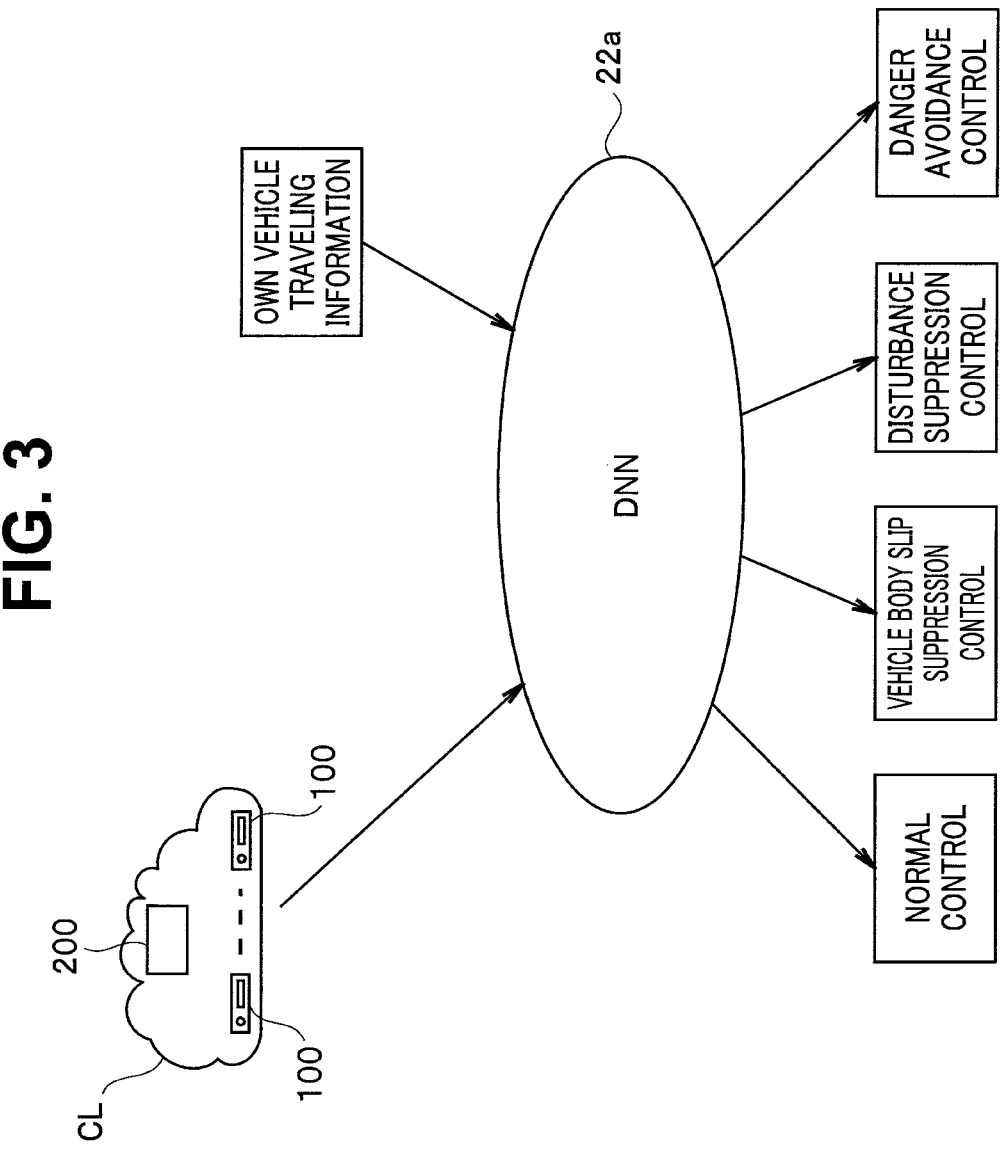
FIG. 3 is an explanatory diagram illustrating a selection of a control system by a multi-layer neural network.

In the present embodiment, switching to the high motion control including whether it is necessary to change the path plan is determined by artificial intelligence provided for the traveling behavior controller 22. The artificial intelligence of the traveling behavior controller 22 is formed centered on a Deep Neural Network (DNN) 22a as illustrated in FIG. 3. As a network model, for example, a Convolutional Neural Network (CNN), which is a kind of a forward propagation neural network that is not fully connected is used, and it is possible to select an optimum control system by supervised deep learning using this convolutional neural network.

FIG. 3 is an explanatory diagram illustrating a selection of a control system using a multi-layer neural network. As illustrated in FIG. 3, the DNN 22a receives cloud information including at least information from the edge server 100 and own vehicle traveling information from the own vehicle traveling information acquisition unit 40. The DNN 22a makes inferences at a high speed with respect to data of an input layer using a learned hidden layer and outputs an optimum type of traveling control system singly or in combination from the output layer.

In the present embodiment, when the DNN 22a determines the presence or absence of dangerous events simultaneously, and if no dangerous event is recognized, normal control (normal automatic driving control) is selected, or if a dangerous event is recognized, a high motion control system is selected depending on the dangerous event. As the high motion control by the high motion control system, body slip suppression control for suppressing a slip of the body (wheels) during curve traveling on a low friction road surface, disturbance suppression control for suppressing influences of disturbance such as crosswind, danger avoidance control for avoiding danger of collision with an obstacle or oncoming vehicle or the like corresponding to examples of dangerous events as illustrated in FIG. 4 to FIG. 7 are selected singly or in combination.

Figure 4:
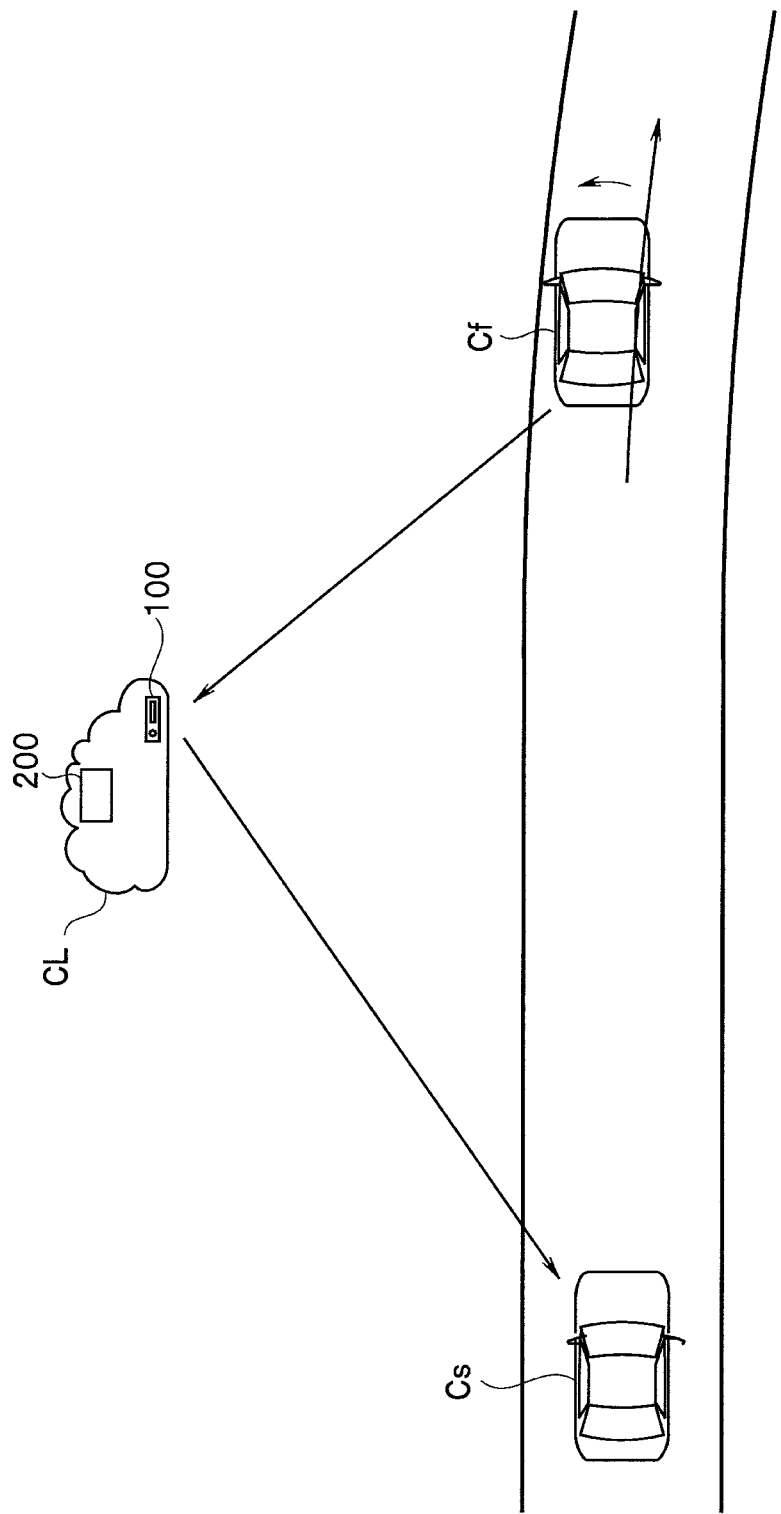
FIG. 4 is an explanatory diagram illustrating a dangerous event when traveling on a curve of a low friction road surface.

FIG. 4 is an explanatory diagram illustrating a dangerous event in the case of traveling on a curve on a low friction road surface. As illustrated in FIG. 4, when the preceding vehicle Cf followed by the own vehicle Cs slips due to a frozen road surface or the like causing a side slip prevention apparatus to operate, slip information of the preceding vehicle Cf is quickly transmitted to the own vehicle Cs via the edge server 100 of the cloud environment CL.

When the own vehicle Cs receives the slip information of the preceding vehicle Cf, the traveling behavior controller 22 of the automatic driving control unit 20 switches the current automatic driving control to high motion control with body slip suppression. The high motion control at this time performs such control that stabilizes vehicle behavior when the own vehicle Cs enters a curve with a low road surface frictional coefficient by slowing down of the vehicle speed, early intervention of yaw moment control, intervention of steering control with high steering speed or the like.

Figure 5:
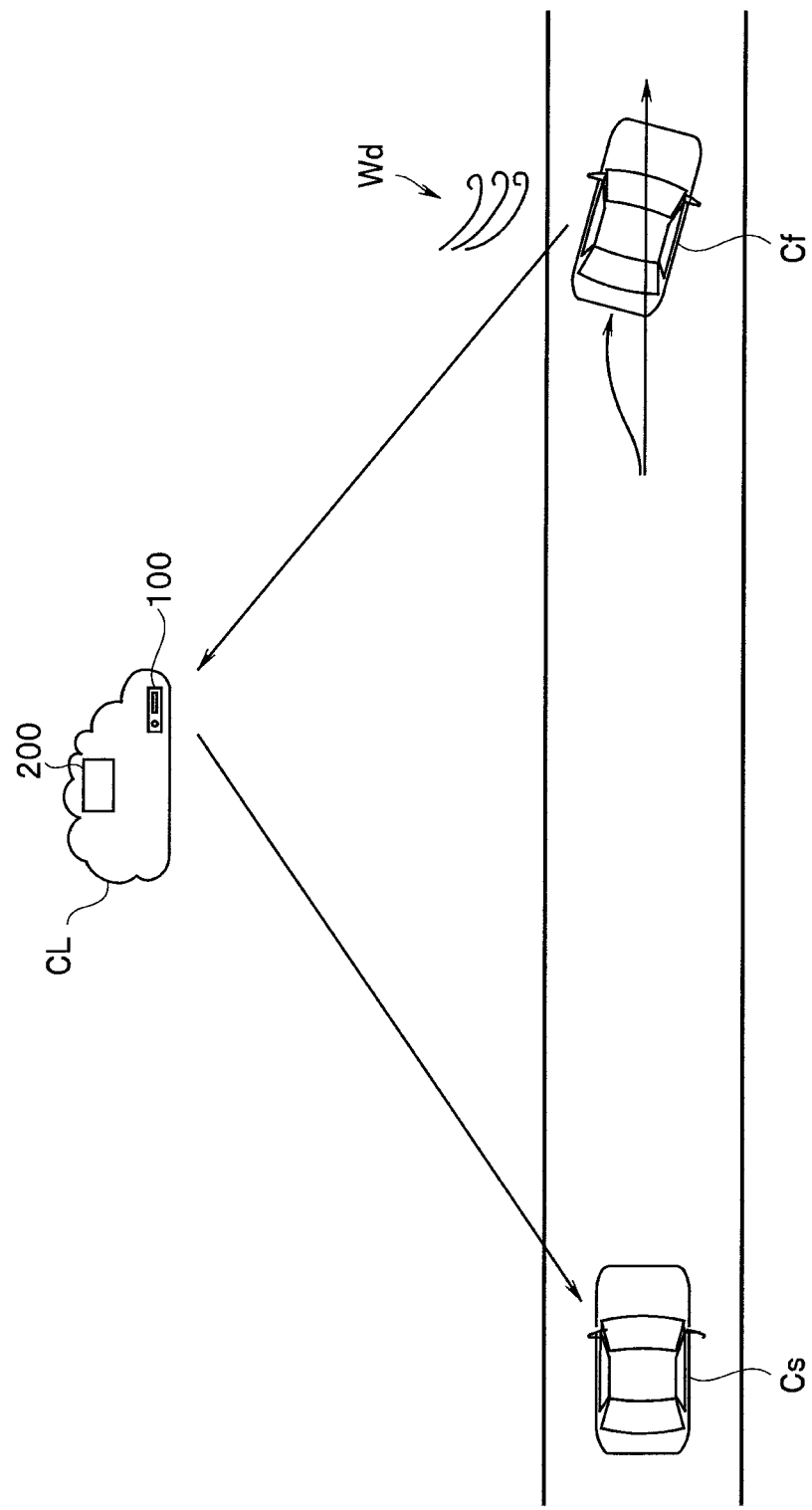
FIG. 5 is an explanatory diagram illustrating a dangerous event when crosswind is received.

FIG. 5 is an explanatory diagram illustrating a dangerous event when crosswind is received. As illustrated in FIG. 5, when the preceding vehicle Cf followed by the own vehicle Cs receives crosswind Wd and is considerably displaced laterally and if excessive lateral position correction steering is performed, steering control information on excessive lateral position correction of the preceding vehicle Cf is quickly transmitted to the own vehicle Cs via the edge server 100 of the cloud environment CL.

When the own vehicle Cs receives the steering control information on the excessive lateral position correction of the preceding vehicle Cf, the traveling behavior controller 22 of the automatic driving control unit 20 switches the current automatic driving control to high motion control of disturbance suppression. The high motion control at this time becomes such control that prevents departure from the course by crosswind as lateral position control stronger than normal control by increasing the gain of steering control and enhancing the steering speed.

Figure 6:
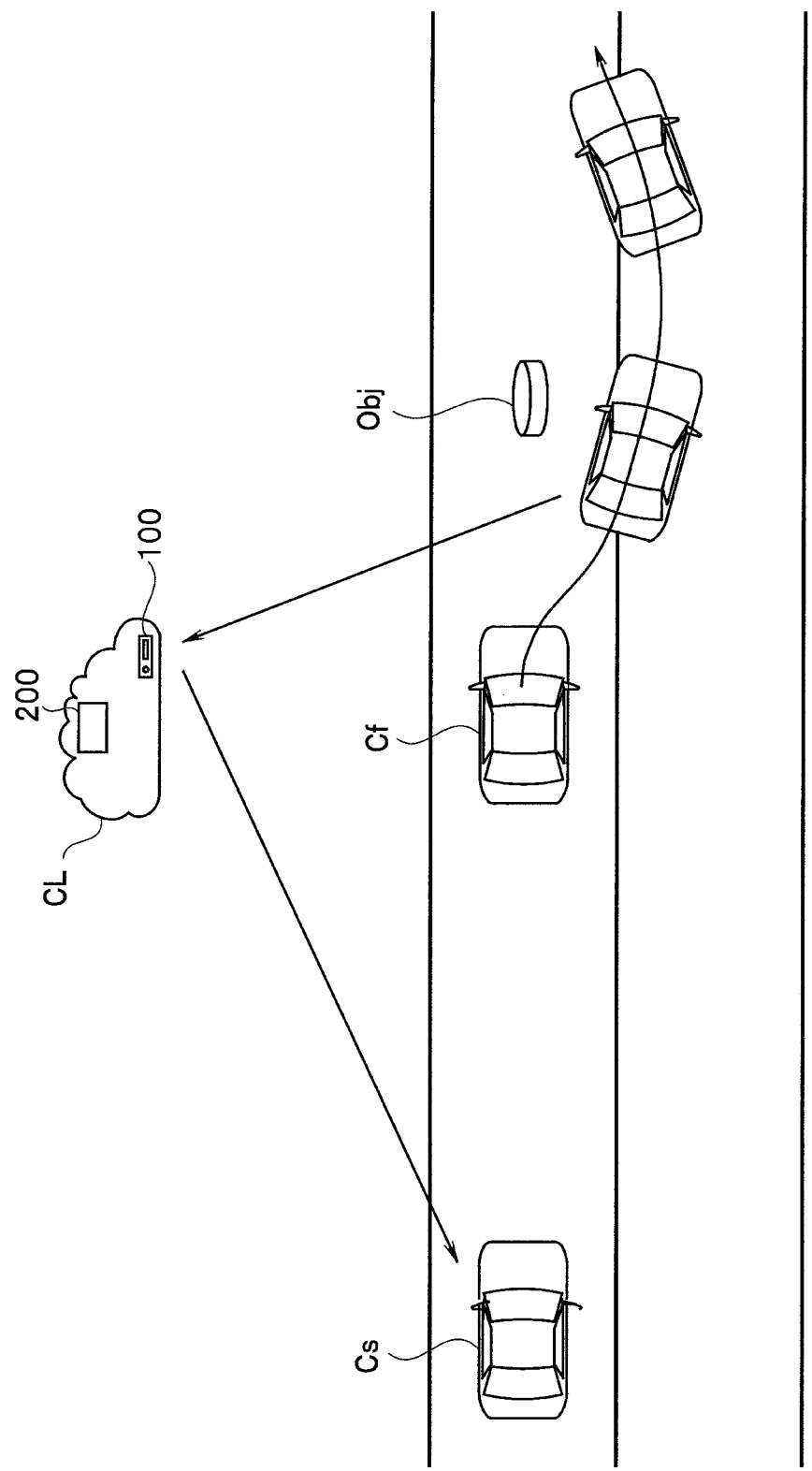
FIG. 6 is an explanatory diagram illustrating a dangerous event when a preceding vehicle urgently avoids an obstacle.

FIG. 6 is an explanatory diagram illustrating a dangerous event when a preceding vehicle avoids an obstacle urgently. As illustrated in FIG. 6, when the preceding vehicle Cf followed by the own vehicle Cs performs avoidance driving urgently to avoid an obstacle Obj on the road, urgent avoidance driving information of the preceding vehicle Cf is quickly transmitted to the own vehicle Cs via the edge server 100 of the cloud environment CL.

When the own vehicle Cs receives the urgent avoidance driving information of the preceding vehicle Cf, the traveling behavior controller 22 of the automatic driving control unit 20 switches the current automatic driving control to high motion control of danger avoidance. The high motion control at this time becomes such control that avoids contact with the obstacle Obj or reduces damage by abrupt deceleration, high response steering control, prioritization of processing speed of recognition and control, expansion of the traveling region including a road shoulder.

Figure 7:
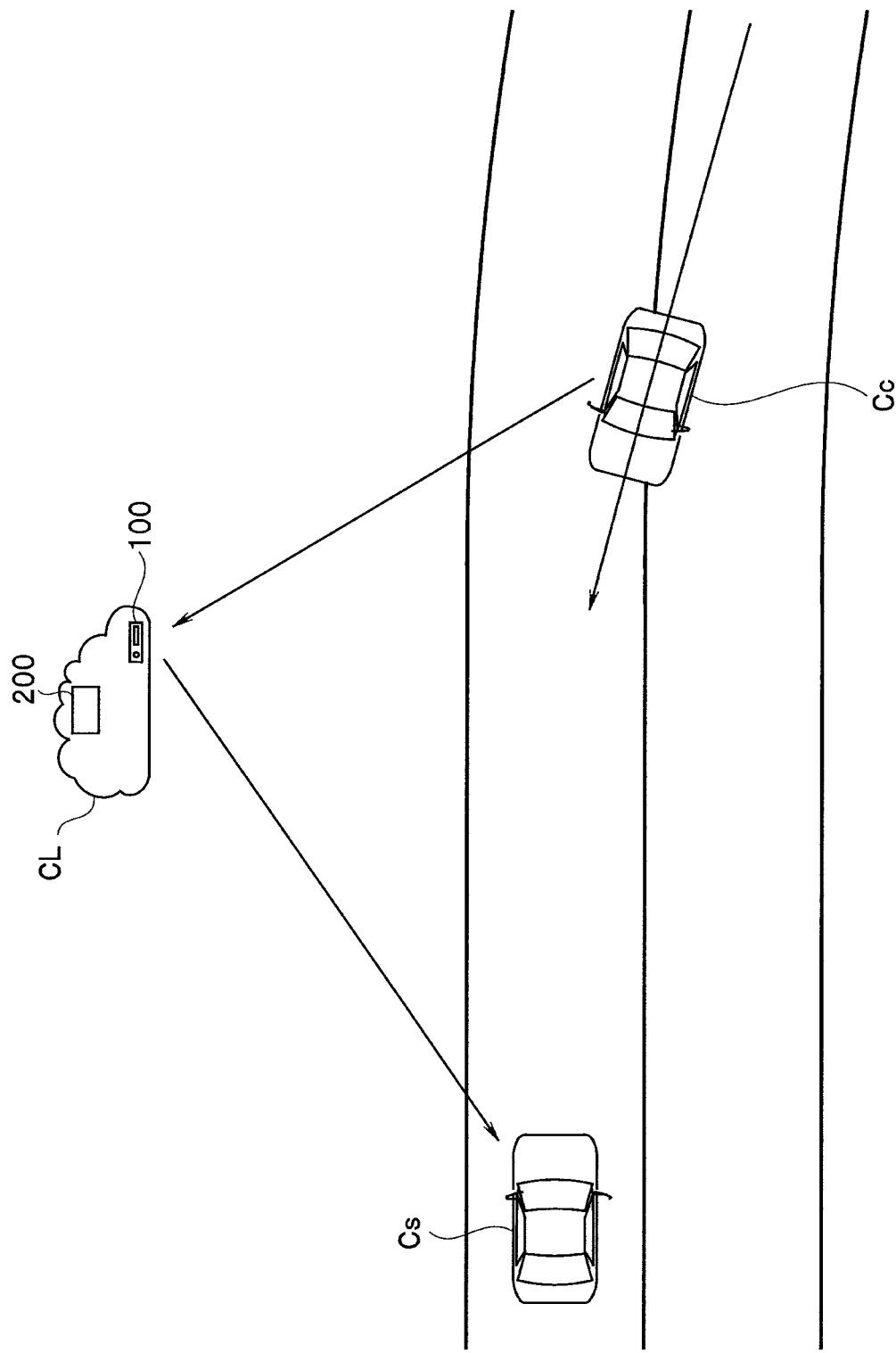
FIG. 7 is an explanatory diagram illustrating a dangerous event in which an oncoming vehicle departs from a lane.

FIG. 7 is an explanatory diagram illustrating a dangerous event of lane departure of an oncoming vehicle. In FIG. 7, when the oncoming vehicle Cc strays onto the lane of the own vehicle Cs due to dozing driving or the like, the edge server 100 of the cloud environment CL detects the lane departing behavior from vehicle information such as a lane arrangement structure of the road, lateral position and yaw rate or the like of the oncoming vehicle Cc, and notifies the own vehicle Cs of the lane departing behavior.

When the own vehicle Cs receives the lane departing behavior information of the oncoming vehicle Cc, the traveling behavior controller 22 of the automatic driving control unit 20 switches the current automatic driving control to danger avoidance control similar to the obstacle avoidance in FIG. 6. That is, the traveling behavior controller 22 avoids contact with oncoming vehicle Cc by abrupt deceleration, high response steering control, prioritization of processing speed of recognition and control, expansion of the traveling region including a road shoulder or the like and performs control that can reduce damage at worst.

Figure 8:
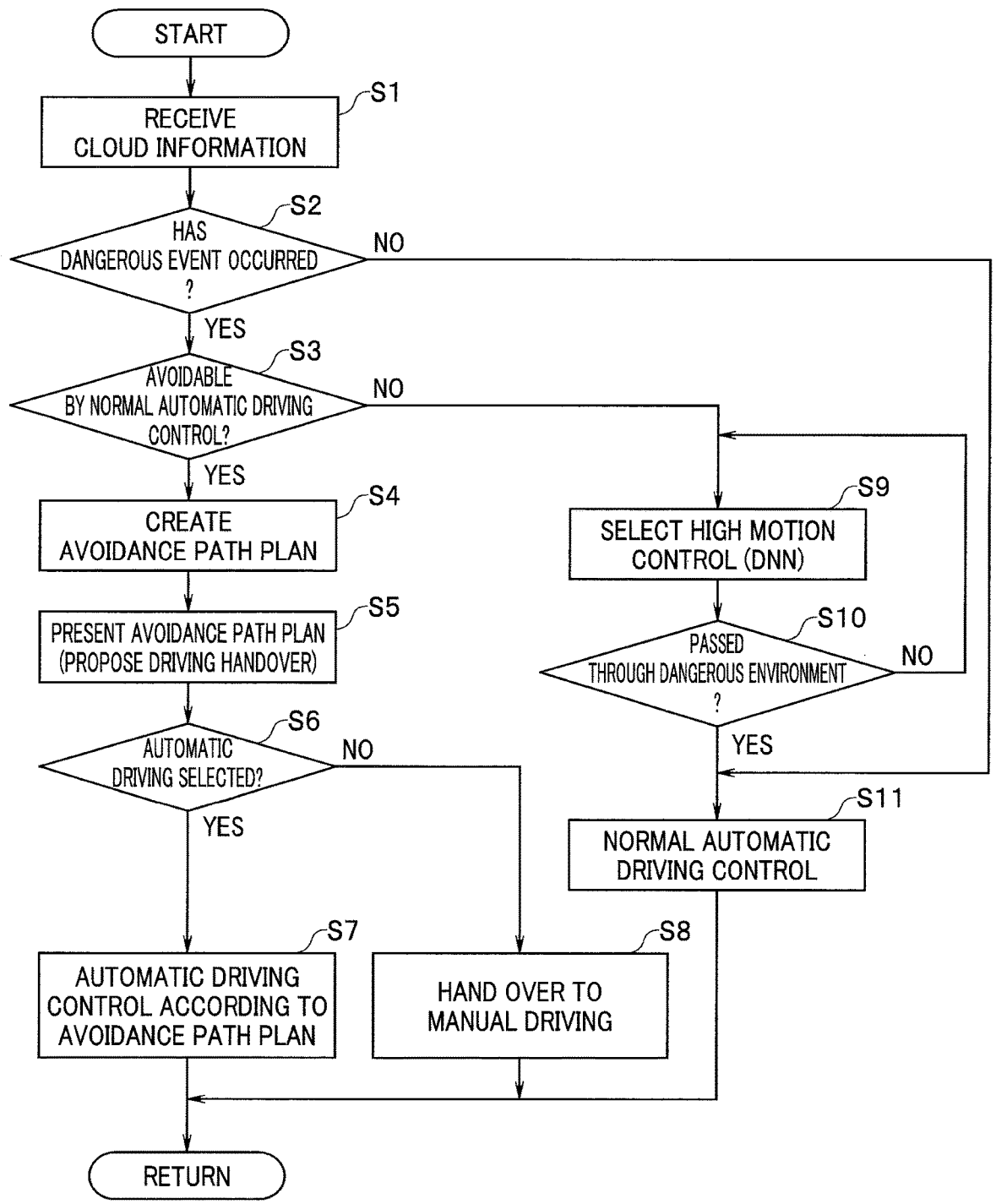
FIG. 8 is a flowchart illustrating a control switching process of automatic driving.

Next, operation of the above-described traveling control system 10 will be described by focusing on operation of the automatic driving control unit 20 illustrated in a flowchart in FIG. 8. FIG. 8 is a flowchart illustrating control switching processing of automatic driving.

The automatic driving control unit 20 receives the cloud information from the cloud environment CL in first step S1 and determines in step S2 whether a dangerous event has occurred ahead. When the automatic driving control unit 20 determines in step S2 that no dangerous event has occurred, the automatic driving control unit 20 proceeds to step S11, performs normal automatic driving control, and when it determines that a dangerous event has occurred, the automatic driving control unit 20 determines in step S3 whether it is possible to avoid the dangerous event within a control range of the normal automatic driving control.

Note that, in the present embodiment, the automatic driving control unit 20 mainly operates artificial intelligence using the DNN 22a and determines switching between automatic driving control and high motion control including whether a dangerous event can be avoided using artificial intelligence.

When the automatic driving control unit 20 determines in step S3 that the dangerous event can be avoided within the control range of normal automatic driving control, the automatic driving control unit 20 creates an avoidance path plan in step S4. After proceeding to step S5, the automatic driving control unit 20 presents the avoidance path plan to the driver by displaying the avoidance path plan and a screen for selecting automatic driving or manual driving on a display and proposes driving handover.

Next, the automatic driving control unit 20 examines in step S6 whether automatic driving is selected. When automatic driving is selected, the automatic driving control unit 20 performs automatic driving control according to the avoidance path plan in step S7, and when manual driving is selected, the automatic driving control unit 20 stops automatic driving control in step S8 and hands the operation over to manual driving by the driver's operation. In this case, it is preferable to perform driving assist control for assisting the driver's operation.

On the other hand, when it is determined in step S3 that the dangerous event cannot be avoided within the control range of normal automatic driving control, the automatic driving control unit 20 proceeds from step S3 to step S9 and the automatic driving control unit 20 selects optimum high motion control using artificial intelligence based on the cloud information and the own vehicle traveling information. When the automatic driving control unit 20 selects optimum high motion control, it stops the automatic driving control and controls the traveling behavior of the own vehicle so as to avoid the dangerous event by the high motion control.

Then, after proceeding from step S9 to step S10, the automatic driving control unit 20 examines whether the vehicle has passed through a dangerous environment in which the dangerous event has occurred. When the vehicle has not passed through the dangerous environment yet, the automatic driving control unit 20 returns from step S10 to step S9, continues the high motion control, and when the vehicle has passed through the dangerous environment, the automatic driving control unit 20 proceeds from step S10 to step S11 and returns to the normal automatic driving control.

In this way, in the present embodiment, the cloud information acquisition unit 30 communicates with the cloud environment including the edge environment and acquires the cloud information including traveling information of the other vehicles from at least the edge environment. The automatic driving control unit 20 then determines whether it is necessary to change the path plan of automatic driving and the automatic driving control based on the cloud information and controls the traveling behavior of the own vehicle based on the cloud information and the own vehicle traveling information depending on whether a change is needed. Therefore, when an environmental change or a dangerous situation is predicted during traveling by automatic driving, if there is a margin time until danger avoidance, the automatic driving control unit 20 handles the situation by automatic driving with the path plan changed and only if there is no margin time until danger avoidance, the automatic driving control unit 20 switches the control to control that prioritizes danger avoidance, and it is thereby possible to reduce the driver's uncomfortable feeling or sense of insecurity.

In addition to the above-described computer, the traveling control system 10 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the path plan setter 21, the cloud information acquisition unit 30, the own vehicle traveling information acquisition unit 40, the automatic driving control unit 20 including the traveling behavior controller 22, the braking and driving control unit 50, the steering control unit 60 and the information notification unit 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control system comprising:
a cloud information acquisition unit configured to communicate with a cloud environment comprising an edge environment and acquire traveling information of other vehicles from at least the edge environment;
an own vehicle traveling information acquisition unit configured to recognize a traveling environment of an own vehicle and acquire a vehicle control state of the own vehicle; and
an automatic driving control unit configured to:
set a path plan for the own vehicle to travel under automatic driving control;
determine, based on the acquired traveling information, that a dangerous event is recognized ahead of the own vehicle along the set path plan;
in response to the dangerous event being recognized ahead of the own vehicle along the set path plan, determine whether the dangerous event can be avoided by the automatic driving control based on determining whether the acquired traveling information indicates that i) a preceding vehicle of the other vehicles is displaced in a lateral direction of the preceding vehicle and performed a lateral position correction steering to recover from the lateral direction displacement or ii) an oncoming vehicle of the other vehicles departs from a traveling lane of the oncoming vehicle into a traveling lane of the own vehicle;
when the dangerous event is an obstacle that can be avoided by the automatic driving control based on determining that the acquired traveling information does not indicate that i) the preceding vehicle is displaced in the lateral direction or ii) the oncoming vehicle departs into the traveling lane of the own vehicle, i) create an avoidance path plan different from the set path plan and ii) control the own vehicle to a) travel the avoidance path plan under the automatic driving control orb) travel under manual driving; and
when the dangerous event is a low friction road surface or a crosswind that cannot be avoided by the automatic driving control based on determining that the acquired traveling information does not indicate that i) the preceding vehicle is displaced in the lateral direction or ii) the oncoming vehicle departs into the traveling lane of the own vehicle, switch from the automatic driving control to high motion control, to control the own vehicle to travel through the dangerous event under the high motion control along the set path plan, when the automatic driving control unit controls the own vehicle under the high motion control and when the acquired traveling information indicates that the preceding vehicle of the other vehicles is displaced in the lateral direction of the preceding vehicle and performed the lateral position correction steering to recover from the lateral direction displacement, the automatic driving control unit is configured to increase gain of steering control of the own vehicle higher than the gain of the steering control of the own vehicle under the automatic driving control, and
wherein, when the automatic driving control unit controls the own vehicle under the high motion control and when the acquired traveling information indicates that the oncoming vehicle departs from the traveling lane of the oncoming vehicle into the traveling lane of the own vehicle, the automatic driving control unit is configured to increase an upper limit value of yaw rate of the own vehicle higher than the upper limit value of the yaw rate of the own vehicle under the automatic driving control.

2. The vehicle traveling control system according to claim 1, wherein the automatic driving control unit determines whether the dangerous event can be avoided by the automatic driving control on a basis of a margin time for the dangerous event.

3. The vehicle traveling control system according to claim 2, wherein when the automatic driving control unit determines that the dangerous event cannot be avoided by the automatic driving control, the automatic driving control unit switches the automatic driving control to the high motion control according to artificial intelligence using a multi-layer neural network is configured to receive the acquired traveling information of the other vehicles, the recognized traveling environment, and the vehicle control state of the own vehicle.

4. The vehicle traveling control system according to claim 2, wherein when the automatic driving control unit determines that the dangerous event can be avoided by the automatic driving control, the automatic driving control unit creates an avoidance path plan with the path plan changed, presents the avoidance path plan to a driver of the own vehicle and allows the driver to select either one of automatic driving based on the avoidance path plan and manual driving by the driver.

5. The vehicle traveling control system according to claim 2, wherein the high motion control comprises body slip suppression control for suppressing a slip, disturbance suppression control for suppressing an influence of disturbance and danger avoidance control for avoiding a danger including damage reduction.

6. The vehicle traveling control system according to claim 2, wherein the traveling information comprises acceleration, deceleration, a steering speed, a yaw rate, an operating state of an anti-lock brake system and an operating state of a side slip prevention apparatus of the other vehicles.

7. The vehicle traveling control system according to claim 1, wherein when the automatic driving control unit determines that the dangerous event cannot be avoided by the automatic driving control, the automatic driving control unit switches the automatic driving control to the high motion control according to artificial intelligence using a multi-layer neural network is configured to receive the acquired traveling information of the other vehicles, the recognized traveling environment, and the vehicle control state of the own vehicle.

8. The vehicle traveling control system according to claim 1, wherein when the automatic driving control unit determines that the dangerous event can be avoided by the automatic driving control, the automatic driving control unit creates an avoidance path plan with the path plan changed, presents the avoidance path plan to a driver of the own vehicle and allows the driver to select either one of automatic driving based on the avoidance path plan and manual driving by the driver.

9. The vehicle traveling control system according to claim 1, wherein the high motion control comprises body slip suppression control for suppressing a slip, disturbance suppression control for suppressing an influence of disturbance and danger avoidance control for avoiding a danger including damage reduction.

10. The vehicle traveling control system according to claim 1, wherein the traveling information comprises acceleration, deceleration, a steering speed, a yaw rate, an operating state of an anti-lock brake system and an operating state of a side slip prevention apparatus of the other vehicles.

11. A vehicle traveling control system comprising circuitry configured to:
communicate with a cloud environment comprising an edge environment and acquire traveling information of other vehicles from at least the edge environment;
recognize a traveling environment of an own vehicle and acquire a vehicle control state of the own vehicle;
set a path plan for the own vehicle to travel under automatic driving control; determine, based on the acquired traveling information, that a dangerous event is recognized ahead of the own vehicle along the set path plan;
in response to the dangerous event being recognized ahead of the own vehicle along the set path plan, determine whether the dangerous event that can be avoided by the automatic driving control based on determining whether the acquired traveling information indicates that i) a preceding vehicle of the other vehicles is displaced in a lateral direction of the preceding vehicle and performed a lateral position correction steering to recover from the lateral direction displacement or ii) an oncoming vehicle of the other vehicles departs from a traveling lane of the oncoming vehicle into a traveling lane of the own vehicle;
when the dangerous event can be avoided by the automatic driving control based on determining that the acquired traveling information does not indicate that i) the preceding vehicle is displaced in the lateral direction or ii) the on coming vehicle departs into the traveling lane of the own vehicle, i) create an avoidance path plan different from the set path plan and ii) control the own vehicle to a) travel the avoidance path plan under the automatic driving control or b) travel under manual driving; and
when the dangerous event cannot be avoided by the automatic driving control based on determining that the acquired traveling information does not indicate that i) the preceding vehicle is displaced in the lateral direction or ii) the oncoming vehicle departs into the traveling lane of the own vehicle, switch from the automatic driving control to high motion control, to control the own vehicle to travel through the dangerous event under the high motion control along the set path plan,
wherein, when the circuitry controls the own vehicle under the high motion control and when the acquired traveling information indicates that the preceding vehicle of the other vehicles is displaced in the lateral direction of the preceding vehicle and performed the lateral position correction steering to recover from the lateral direction displacement, the circuitry is configured to increase gain of steering control of the own vehicle higher than the gain of the steering control of the own vehicle under the automatic driving control, and
wherein, when the circuitry controls the own vehicle under the high motion control and when the acquired traveling information indicates that the oncoming vehicle departs from the traveling lane of the oncoming vehicle into the traveling lane of the own vehicle, the circuitry is configured to increase an upper limit value of yaw rate of the own vehicle higher than the upper limit value of the yaw rate of the own vehicle under the automatic driving control.

* * * * *